Figure 1:
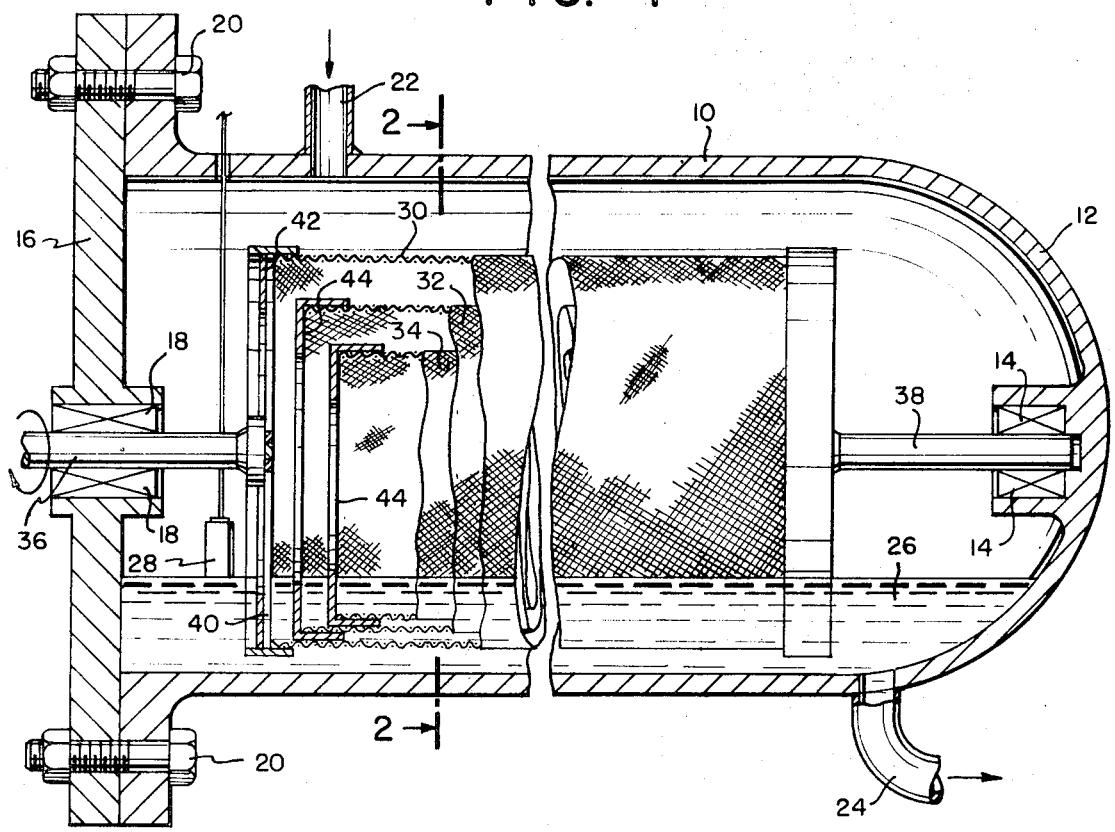

United States Patent
Barnes, Jr. et al.

[15] 3,684,256

[45] Aug. 15, 1972

[54] LIQUID-GAS CONTACTOR

[72] Inventors: Vernon M. Barnes, Jr., Richmond; Rudolph C. White, Midlothian, both of Va.

[73] Assignee: Texaco Inc., New York, N.Y.

[22] Filed: July 6, 1970

[21] Appl. No.: 52,225

[52] U.S. Cl. ................................................261/92
[51] Int. Cl. ................................................B01f 3/04
[58] Field of Search.................................261/92, 83

[56] References Cited

UNITED STATES PATENTS

| | | | |
|---|---|---|---|
| 2,440,446 | 4/1948 | Kenny | 261/92 |
| 1,826,508 | 10/1931 | Decker | 261/92 |
| 3,306,591 | 2/1967 | Valazza | 261/92 |
| 3,021,831 | 2/1962 | Byrge | 261/92 |
| 3,353,337 | 11/1967 | Gale | 261/92 |
| 3,442,495 | 5/1969 | Schreiber | 261/92 |

FOREIGN PATENTS OR APPLICATIONS 9,922 8/1907 Denmark..................261/92

OTHER PUBLICATIONS

German Printed Appl. No. 1,187,587 Kunze et al. 8/17/61.

*Primary Examiner*—Tim R. Miles
*Attorney*—Thomas H. Whaley, Carl G. Reis and L. H. Phelps, Jr.

[57] ABSTRACT

A liquid-gas contactor in which one or more cylindrical screens constantly revolve about their axes, with their lower periphery dipping into the liquid so that films of the liquid are constantly carried thru an atmosphere of reactant gas which is maintained above the liquid. The cylindrical screens may be of respectively decreased diameter, arranged one internally within the other, and the inner screens may rest on the inner surface of the outer larger diameter screen so that it rotates therewith by rolling contact.

8 Claims, 4 Drawing Figures

LIQUID-GAS CONTACTOR

The present invention relates to a liquid-gas contactor and particularly to the absorption or reaction of a gas by or with a liquid.

In chemical processes involving relatively slow absorption or reaction of a liquid and a gas, such as the so-called hydrogenation, for example, of a petroleum product, progress of the absorption or reaction, as the case may be depends upon the area of surface contact between the un-reacted liquid and the gas.

Reference herein to relatively slow rates of reaction or absorption means actions wherein the gas is progressively absorbed or reacted with the liquid at the interface and at a rate requiring excellent and somewhat prolonged contact.

Also the words "reactant gas" or "liquid," as the case may be, or to "absorption" or "reaction" of said constituents, refer not only to the interaction of such materials which respectively enter into chemical reaction with each other but to those which are desirably absorbed or adsorbed to form a desirable combined product.

Among the multiplicity of the devices heretofore proposed for accomplishing such contact, possibly the most common are packed columns or towers in which the liquid flows downwardly through a relatively elevated column usually occupied by a packing of particles or elements of various shapes to break up and distribute the flow of liquid in an upcoming flow of gases. Another variation of this is the tray tower which conducts a gravity flow of the liquid in thin layers through a series of trays ordinarily including liquid falls or sprays, again in an atmosphere of reactive gases.

The shortcomings of such systems have been widely demonstrated and accepted.

The present invention, on the other hand, involves a rotary reactor involving one or more preferably cylindrical members which continuously dip into the liquid and convey it in thin films through, and in contact with, an atmosphere of reactant gases. Preferably the cylindrical members are selected to carry thin, highly exposed films of liquid which even during rotation tend to drain downwardly and expose fresh surface.

This has the advantage of constantly exposing surfaces of unreacted liquid and thus promoting more or less uniform exposure and interaction of the reactants at fresh interfaces and under readily predeterminable parameters so that the design may accurately accord with the requirements of the system.

Figure 2:
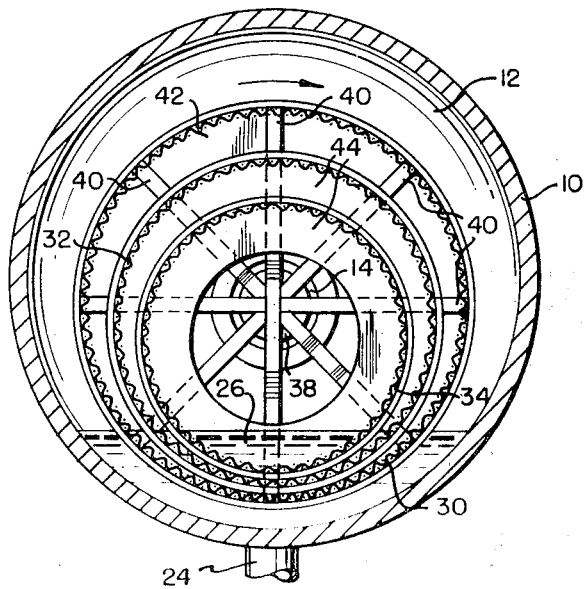
Figure 3:
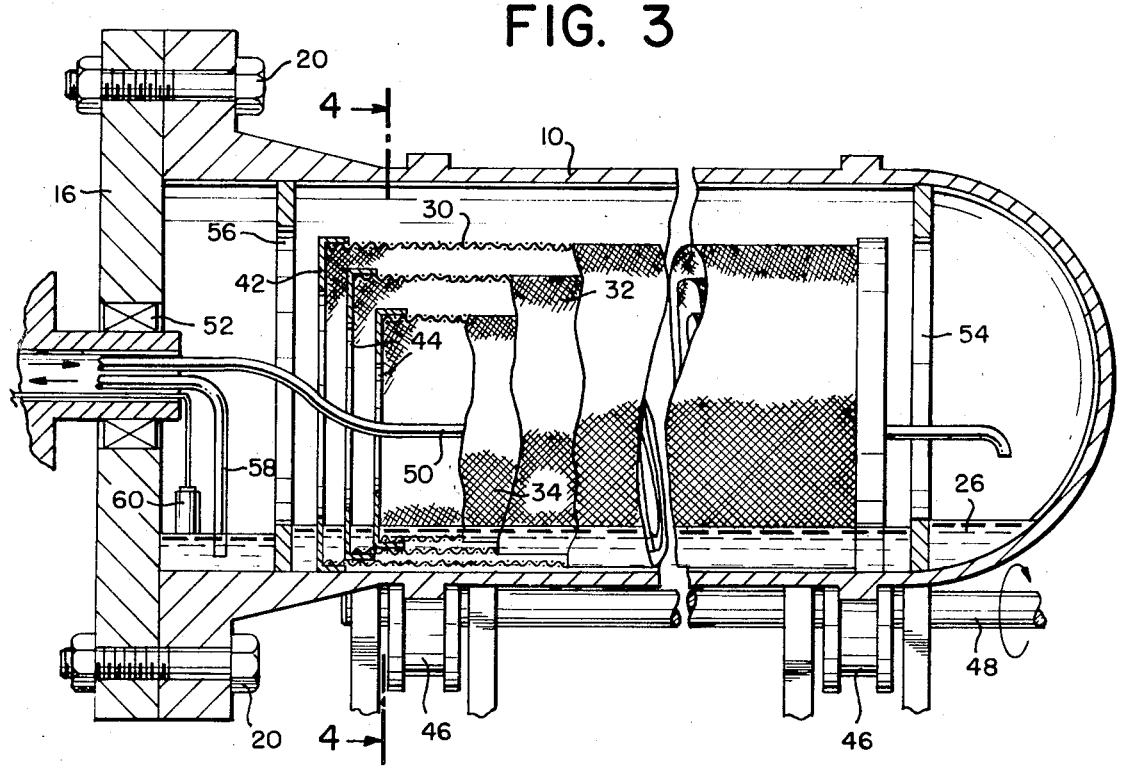
Figure 4:
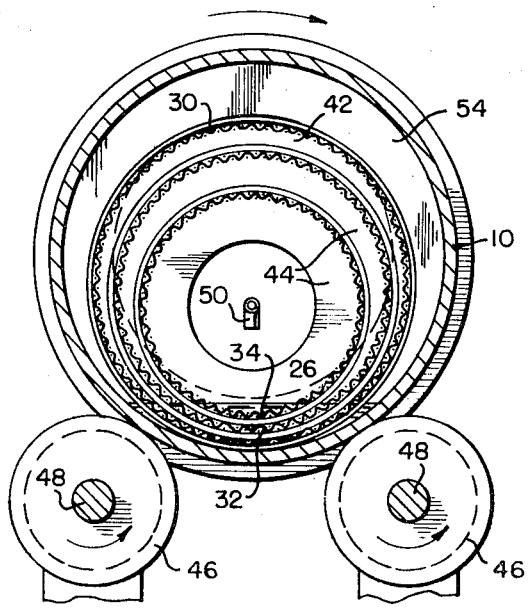

More specifically, in order to explain the invention in greater detail and to illustrate the features of the present invention, reference is made to the attached figures of the drawing wherein FIG. 1 is a transverse vertical section taken through a reactor constructed in accordance with the present invention, FIG. 2 is a vertical section taken on the line 2—2 of FIG. 1, FIG. 3 is a transverse vertical section taken axially through a somewhat modified form of reactor, and FIG. 4 is a transverse vertical section taken on the line 4—4 of FIG. 3.

Referring to FIGS. 1 and 2, the numeral 10 represents a cylindrical housing 10 closed at one end by curved wall 12, carrying bearing 14. The opposite extremity of the tubular housing 12 is enclosed by plate 16 which carries bearing 18, preferably provided with a rotary shaft seal not shown. The plate 16 may be releasably secured to the housing 10 by suitable fasteners 20. A suitable supply of liquid reactant is furnished to the housing 10 via inlet 22, being withdrawn through liquid outlet 24.

Suitable means, not shown, is preferably provided to maintain a constant level of liquid 26 within the reactor. In this case such means is controlled by liquid level float 28.

Obviously, in view of the foregoing, a suitable weir or riser may be associated with outlet 24 to accomplish this purpose.

In operation the liquid is continuously picked up on nested cylinders 30, 32 and 34 which are continuously rotated, with the lower parts continuously dipping into, and being immersed in the liquid.

This is effected by virture of the fact that the outermost cylinder 30 is mounted upon shafts 36 and 38 which rotate in the foregoing bearings 18 and 14 respectively, the shafts being, in turn, coaxially attached to the extremities of cylinder 30 by means of suitable spider elements 40. These may, for example, comprise angularly spaced, radial arms which permit the free access of gas to the central portion of the cylinders as will hereinafter be more fully explained.

Accordingly therefore, with the foregoing construction, the internal and smaller diameter cylinders 32 and 34, nested within the cylinder 30, rest on the bottom thereof and as the cylinder 30 rotates, the other two cylinders are accordingly carried by it in the same rotational direction, but as will hereinafter appear, at significantly different angular rates of revolution.

It is to be noted that the outer cylinder 30 preferably has at its axial extremities, inwardly projecting annular flanges 42 to confine the inner cylinder or cylinders as the case may be. Corresponding annular flanges 44 may be provided on the inner tubes or cylinders 32 and 34 if desirable or necessary although minimization of the size and extent of these annular members is usually advisable to permit free access of gas to the interior thereof. In brief, therefore, the shafts 36 and 38 support and drive the outer cylinder about its axis so that it continuously dips into the liquid reactant while the internally nested screens simply roll thereon. As a result the screens continuously carry films of liquid upwardly through arcuate paths.

Not only the liquid but the gas likewise may be admitted through inlet pipe 22, no outlet being necessary for a gas of the type which can be and is completely consumed or absorbed by the so-called reactant liquid. On the other hand, gas outlet can be added if it is desired to remove gaseous product or to recycle the gas.

Thus in the hydrogenation of a liquid hydrocarbon, for example, the liquid is preferably introduced through pipe 22 and retained for a predetermined period of time at a predetermined depth in the tube 10 by means of level control means previously mentioned.

Accordingly, during this period, the shaft 36 is continuously rotated by drive means not shown, to rotate the three cylinders 30, 32 and 34, each of which is continuously dipping into the liquid at its lower face and carrying a thin layer upwardly through the rotational path into and in contact with the surrounding atmosphere of hydrogen gas likewise continuously introduced through 22.

It is to be particularly noted that in addition to the thin film and high exposure area of contact thus effected, the several cylinders rotate at significantly different rates of revolution. This therefore means that, at least in the open spaces between the top sections of the various cylinders, the surfaces are moving at substantial disparate rotational velocities to effect a constant shearing effect on the gaseous atmosphere, and thereby to avoid what engineers refer to as the skin effect and to constantly present fresh contact surface. These effects are improved by the fact that there is usually an inherent drainage going on from the upper surface of the rotating cylinder downwardly toward the lower pool of liquid 26.

To enhance the foregoing effect it is preferred to provide cylinders of roughened or reticulated material such as embossed metal or screening. Wire screening, for example, has the inherent advantage of enabling the presentation of fine films between the reticulations of the screen.

In addition it enables optimum design correlation between the aperture size of the screen and the particular viscosity characteristics of the liquid, for example, to effect a closely controlled rate of film exposure.

A modified form of the foregoing embodiment shown in FIGS. 3 and 4 comprises a reactor 10 which is per se rotated about its axis by spaced drive rolls 46 continuously driven in the same rotational direction by shaft 48. The rollers 46, as shown, form a cradle upon which the tubular reactor turns. This accordingly avoids the necessity for driving the cylinders 30, 32 and 34 which simply rest upon the inner, lower surface of the tube 10 and are rotated by rolling thereon.

Nevertheless, essentially the same result is achieved as in the earlier embodiment, namely the continual rotation of the preferably reticulate screens so as to dip into and pick up films of reactant liquid and to carry it upwardly at different rates through an atmosphere of reactant gas.

In the present embodiment the gas and liquid reactants are preferably introduced by inlet tube 50 through an axially disposed fixture mounted within a rotary swivel joint bearing or seal 52. The inlet tube may discharge into any portion of the reactor as shown, preferably beyond an annular baffle or weir 54.

An appropriate liquid level within and about the screen cylinders is maintained by annular weir 56 near the opposite extremity of the reactor tube. The treated liquid is withdrawn from a sump just beyond weir 56 by a pipe 58 and an appropriate suction pump, not shown. The pump may be operated in response to liquid level control flow 60.

Where the contactor is operated under pressure, the level control will operate a valve instead of pump since the main purpose of the level control in such event is to avoid loss of gas.

The present invention thus provides a reactor which is readily operable at reasonable predetermined temperatures and pressures and is also capable of enabling specifically controlled and predetermined exposure of the reactants. For example, the screens operate within a pool of liquid of controlled and predetermined volume which passes through the system at a specifically controlled rate.

The residence time of the liquid is the function of dynamic liquid capacity and feed rate. Furthermore, each liquid particle actually describes a helix as it is successively exposed to the reactant gas while migrating from inlet to outlet.

We claim:

1. A liquid gas reactor comprising an elongated fluid holding housing defining an enclosure therein,
   means for passing a stream of liquid through said housing and for maintaining a pool of said liquid in the housing lower section,
   means for introducing a gaseous medium into said housing whereby to maintain an atmosphere of said medium within the housing,
   a plurality of cylindrical members disposed longitudinally of said housing and being at least partially immersed in said pool of liquid, said respective cylindrical members being nested one within the other, the inner of said cylindrical members being supported by the next adjacent outer member, and
   means for rotating the outermost of said cylindrical members whereby the respective inner cylindrical members will be rotated at a greater speed than said outer member.

2. A liquid gas reactor as defined in claim 1, wherein said cylinder is characterized by an irregular external surface.

3. A liquid gas reactor as defined in claim 1, wherein said respective cylindrical members are formed of reticulated material.

4. In a liquid gas reactor as defined in claim 1, including; drive means engaging said outer cylindrical member and operable to rotate said outer member.

5. In a liquid gas reactor as defined in claim 1, including; a drive shaft journalled longitudinally of said housing and supporting the outer of said cylindrical members, and means for rotating said drive shaft whereby to rotate said outer cylindrical member.

6. In a liquid gas reactor as defined in claim 1, including; float means disposed within said housing and being operable to regulate the level of liquid maintained in said pool.

7. In a liquid gas reactor as defined in claim 1, including; bearing means rotatably supporting said elongated housing, and means for rotating said housing on said bearing means.

8. In a liquid gas reactor as defined in claim 7, wherein the outer of said cylindrical members is supportably positioned at the inner wall of said housing whereby said inner cylindrical member is rotated in response to rotations of said housing.

* * * * *